United States Patent [19]

Vloedman

[11] 4,135,054
[45] Jan. 16, 1979

[54] HIGH VOLTAGE CABLE FITTING WITH A SEALING MEMBER

[75] Inventor: Theodoris H. A. Vloedman, Vlaardingen, Netherlands

[73] Assignee: N.K.F. Kabel B.V., Delft, Netherlands

[21] Appl. No.: 793,037

[22] Filed: May 2, 1977

[30] Foreign Application Priority Data

May 5, 1976 [NL] Netherlands .......................... 7604762

[51] Int. Cl.² ...................... H02G 15/04; H02G 15/22
[52] U.S. Cl. .................................. 174/19; 174/73 R; 174/77 R
[58] Field of Search ............ 174/12 BH, 19, 20, 21 R, 174/22 R, 73 R, 73 SC, 74 R, 75 R, 75 D, 76, 77 R, 80, 89, 93

[56] References Cited

U.S. PATENT DOCUMENTS

| | | | |
|---|---|---|---|
| 2,492,437 | 12/1949 | Palmer | 174/20 |
| 3,471,628 | 10/1969 | Harmon | 174/19 X |
| 3,548,070 | 12/1970 | Duenke | 174/19 X |
| 3,721,745 | 3/1973 | Parks et al. | 174/19 |
| 3,878,313 | 4/1975 | Varner et al. | 174/19 |

FOREIGN PATENT DOCUMENTS

891169  3/1962  United Kingdom .................... 174/19

*Primary Examiner*—Laramie E. Askin
*Attorney, Agent, or Firm*—David R. Treacy

[57] ABSTRACT

A cable fitting filled with a dielectric medium is sealed to the cable surface with a sealing member of an elastic material which can follow radial and axial movement of the cable.

2 Claims, 2 Drawing Figures

HIGH VOLTAGE CABLE FITTING WITH A SEALING MEMBER

BACKGROUND OF THE INVENTION

The invention relates to a cable fitting which is filled with a dielectric medium when mounted on a cable, and more particularly to such a fitting having a sealing member of an elastic material. The sealing member adjoins the cable insulation and is clamped in the cable fitting, and prevents the dielectric medium from penetrating into the cable between the cable insulation and the cable sheath. Fittings of this type are particularly useful for power cables.

In this connection cable fitting will be understood to mean cable terminations, cable entrances and joints and such like. After inserting a cable, such fittings are filled under excess pressure with a dielectric medium in a fluid state, such as a highly viscous liquid or gaseous state, for example oil, paraffin wax or insulation gas. In general the electric properties of a cable fitting are detrimentally affected if leaks occur through which the dielectric medium can flow away. If materials of the above-mentioned kind penetrate into the cable, deterioration of the electric properties of the cable may follow. In particular this may, for example, be the case with high voltage power cables whose insulation has a conducting or semi-conducting coating which serves as core shield.

In prior art constructions for sealing synthetic resin insulated high-voltage cables in a fitting, an annular sealing member of a flexible rubber material is usually used which is clamped by means of metal hold-down means against the cable insulation (see, for example, U.S. Pat. No. 3,721,745). Because of variations in the electric load which are accompanied by an increase and a decrease of the temperature of the cable, a synthetic resin insulated cable can expand and shrink. With the prior art construction of the sealing members there is then the risk that the cable insulation is constricted at the place of application of the sealing member. In the long run the seal will then prove to be insufficiently resistant against the dielectric medium, which is generally under an excess pressure, in the fitting. In addition, unwanted field concentrations occur in the insulation material which may give rise to so-called treeing. Besides the radial expansion the temperature cycles due to load variations to which the cable is normally exposed can also effect axial movement of the cable with respect to the fittings. The sealing member must be able to take up this axial movement also. With the construction according to U.S. Pat. No. 3,721,745 this is impossible or possible only to a limited extent because of the excessive friction between the cable insulation and the sealing ring clamped thereto.

A proper seal is also important because core shields are usually, as explained above, not resistant to the usual dielectric media, such as, for example, insulating oil.

SUMMARY OF THE INVENTION

It is an object of the invention to provide a cable fitting having a sealing member which can be applied in a simple manner on the cable insulation on top of a conductive or semiconductive outer coating which may be present. A further object is that the sealing member guarantees in all circumstances such a seal that, if necessary, the cable fitting with mounted cable end can be evacuated for admitting, in the absence of air, the dielectric medium in the fitting; and no leaks occur if the dielectric medium is in the cable fitting at an excess pressure.

This object is accomplished by means of a cable fitting which, in accordance with the invention, has a sealing member which is a unitary element having a cylindrical part which can expand in the radial direction, and a flange which extends outwards, the sealing member being clamped in the cable fitting by the flange.

According to a preferred embodiment, the flange has a toroidal thickened part by which the sealing member is clamped in the cable fitting.

The flange can be located in the most favorable spot as regards sealing, for example approximately halfway between the ends of the cylindrical part of the sealing member.

The sealing member may consist of a synthetic or natural rubber and is preferably made slightly conductive, for example by means of graphite powder. In addition, the fitting may include field-controlling means which are accommodated in the space filled with the dielectric medium.

A cable fitting which is sealed with a sealing member according to the invention can be evacuated after mounting of the cable and thereafter filled with the dielectric medium, for example oil or gas, to a pressure exceeding 1 atmosphere. To permit evacuation and filling, an opening, which can be closed, is provided in a suitable place.

An embodiment of a cable fitting according to the invention will be described in further detail with reference to the accompanying drawing.

DESCRIPTION OF THE PREFERRED EMBODIMENT

Figure 1:
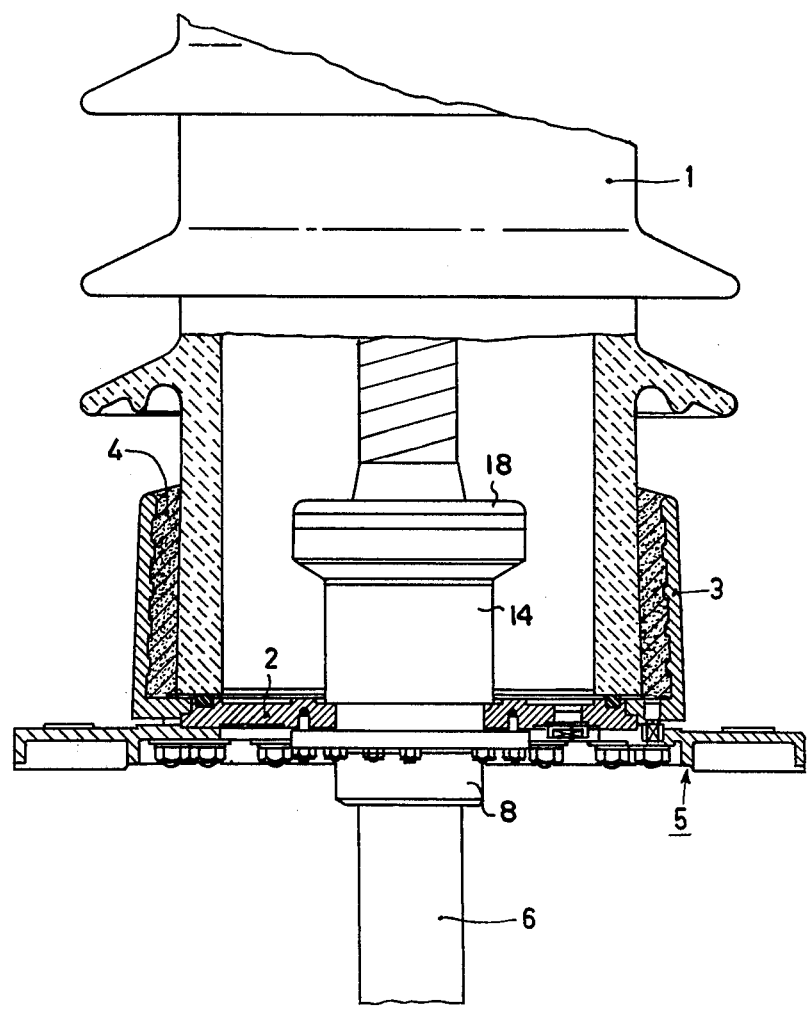
FIG. 1 is a view, partly in longitudinal section, of a portion of a cable fitting in the form of a termination for a synthetic resin insulated high-voltage power cable.

In FIG. 1 reference 1 indicates a portion of a glazed porcelain insulator whose wall has been partly removed to display the interior. The termination is covered at the bottom with a base plate 2 with raised edge 3 which is connected to the porcelain insulator by means of a ceramic cement 4. The figure also shows fastening means 5 which are connected to the metal base plate by means of bolts. The cable 6 is inserted into the interior of the porcelain insulator 1 through an opening in the base plate 2. To this end the base plate 2 is provided with fastening and sealing means consisting of a metal cylindrical cable entrance 7 provided at the bottom with a screwthread which mates with a screwthread at the inside of a metal cap 8. The purpose of this cap 8 is to hold down the sealing rings 9, 10 and 11 to be able to obtain in this manner a moisture-tight seal.

At the side facing away therefrom the cylindrical cable entrance 7 is provided with a circular recess 11 in which an O-ring 12 of an elastic material is accommodated, a screw-thread 13 which mates with a screwthread at the inner wall of a metal fastening part or cylinder 14, and a beveled edge portion around which metal armoring wires 6C of the cable 6 be folded back and clamped by a pressure ring 17 which is captured under a projecting edge on the inner wall of the fastening cylinder 14. Before the cable 6 is inserted into the termination, a portion of the sheath 6A, the metallic ground shield 6B, the armoring 6C and the slightly conductive paper tape winding 6D is removed so that the cable insulation provided with a semiconductive coating 6E is exposed. A sealing member 16 made of oil-resistant elastic material, for example natural or synthetic rubber, is pushed onto this exposed portion. The sealing member 16 has a cylindrical portion 16A having an inside diameter which is slightly smaller than the outside diameter of the cable insulation and coating 6E. Pushing can be facilitated by applying a lubricant such as graphite powder to the cable insulation. The sealing member 16 also has a radially outwardly extending flange 16B, which in the embodiment in the drawing is situated approximately in the center between the two ends of the cylindrical part 16A. In a preferred embodiment around its periphery the flange has a toroidal annular clamping portion 16B which is squeezed between a clamping part or ring 18 and the fastening cylinder 14 by tightening a plurality of screws, two of which are shown in the drawing.

Figure 2:
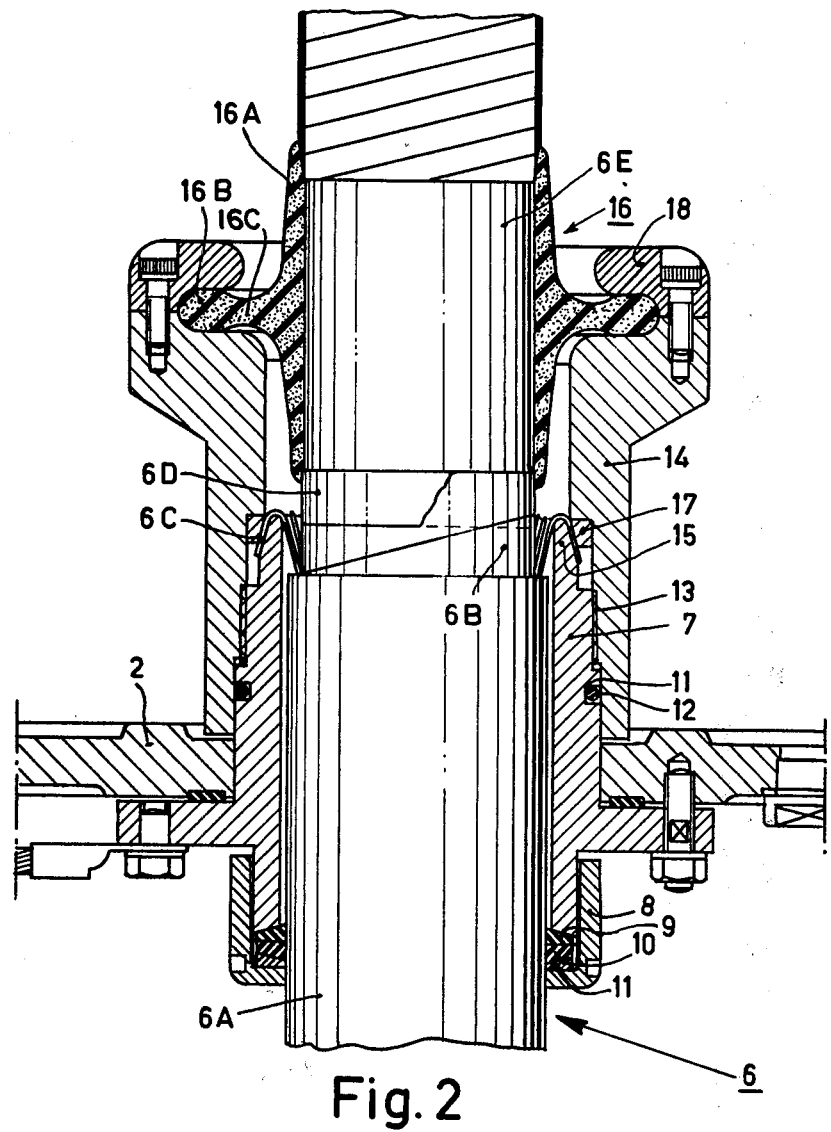
FIG. 2 is a longitudinal section of the sealing member of the cable fitting shown in FIG. 1.

As shown in FIG. 2, between the clamping portion 16B and the cylindrical portion 16A, an intermediate portion 16C of the flange extends free of abutting contact with either the cylinder 14 or ring 18. The intermediate portion 16C has a thickness axially which is less than that of the clamping portion 16B. After the cable 6 has been inserted and mounted in the manner shown in the drawing or in any other customary manner, the open space in the porcelain insulator is evacuated and thereafter filled with insulating oil. Because of the flexibility of the sealing member 16 the cable can undergo both axial and radial movements caused by varying electrical load, without leakage past the sealing member or deterioration of the insulation and coating 6E.

What is claimed is:

1. In a cable fitting for connecting an insulated electric cable having a cylindrical surface, a cable being inserted into the fitting, the fitting having a fastening part bounding a space which is filled with a dielectric fluid medium, and a sealing member formed of elastic material for making a dielectric-fluid-tight seal between said part and said cylindrical surface, the improvement wherein the sealing member is a unitary element consisting of a cylindrical portion which is elastically fitted over said cylindrical surface, and a radially extending flange, said flange having an outer annular clamping portion having two sides and an intermediate portion between the clamping portion and the cylindrical portion, said fastening part is arranged so as to abut one side of said clamping portion only of the sealing member, and said fitting includes a clamping part arranged to abut said clamping portion only at the other side, and means for axially fastening said clamping part to said fastening part so as to exert clamping pressure therebetween on said annular clamping portion.

2. A cable fitting as claimed in claim 1 wherein the clamping portion of the flange is toroidally shaped, and the intermediate portion has lesser axial thickness than the clamping portion.

* * * * *